United States Patent [19]
Shoji

[11] Patent Number: 5,978,658
[45] Date of Patent: Nov. 2, 1999

[54] PORTABLE ANALOG COMMUNICATION DEVICE WITH SELECTABLE VOICE AND DATA FILTERS

[75] Inventor: Shinichiro Shoji, Tokyo, Japan

[73] Assignee: Mitsubishi Denki Kabushiki Kaisha, Japan

[21] Appl. No.: 08/739,355

[22] Filed: Oct. 30, 1996

[30] Foreign Application Priority Data

Oct. 31, 1995 [JP] Japan .................................. 7-283139

[51] Int. Cl.$^6$ ...................................................... H04B 1/38
[52] U.S. Cl. ........................... 455/66; 455/553; 455/557; 455/575; 455/351
[58] Field of Search .................................. 455/66, 75, 74, 455/550, 552, 553, 556, 557, 575, 338.9, 133, 266, 307; 379/93.09, 93.11, 100.15, 100.16; 375/260, 328, 321, 340, 344; 370/493, 494, 495

[56] References Cited

U.S. PATENT DOCUMENTS

| | | | |
|---|---|---|---|
| Re. 31,510 | 1/1984 | Carbrey | 370/50 |
| 3,718,767 | 2/1973 | Ellis | 375/260 X |
| 4,546,212 | 10/1985 | Crowder, Sr. | 370/493 X |
| 4,817,192 | 3/1989 | Phillips et al. | 455/75 |
| 4,903,292 | 2/1990 | Dillon | 379/93 |
| 5,121,009 | 6/1992 | Braathen | 327/552 |
| 5,557,647 | 9/1996 | Kushige et al. | 375/371 |

FOREIGN PATENT DOCUMENTS

| | | |
|---|---|---|
| 0099543 | 2/1984 | European Pat. Off. . |
| 61-154327 | 7/1986 | Japan . |

*Primary Examiner*—Wellington Chin
*Assistant Examiner*—Philip J. Sobutka
*Attorney, Agent, or Firm*—Rothwell, Figg, Ernst & Kurz, p.c.

[57] ABSTRACT

In known portable analog communication devices, even when a data signal is dealt with, the signal is always passed through a band-pass filter designed for filtering a voice signal and thus the data signal encounters an error due to group delay distortion. A portable analog communication device includes: an RF demodulator for demodulating a received RF signal; a first filter for filtering the output signal of the RF demodulator; a second filter having a low group delay; filter connection means for selecting the second filter when the RF signal is a data signal; and device selection means for selecting a device the output signal of the signal processing circuit is provided to depending on whether the RF signal is a voice signal or a data signal.

9 Claims, 8 Drawing Sheets

PORTABLE ANALOG COMMUNICATION DEVICE WITH SELECTABLE VOICE AND DATA FILTERS

BACKGROUND OF THE INVENTION

1. Field of the Invention

The present invention relates to a portable analog communication device having the capability of filtering voice and data signals which have been received or are to be transmitted.

2. Description of the Related Art

In a portable analog communication system, the frequency division multiplex technique is employed to utilize communication channels in a highly efficient manner. For example, in the case of the analog cellular telephone system of AMPS (Advanced Mobile Phone Service) serviced in North America, frequencies 869.04+0.03*n MHz are assigned to receiving channels while frequencies 824.04+0.03*n MHz (n=0 to 831) are assigned to transmitting channels. In such the system, the frequency bandwidth available for each voice communication channel is as narrow as 300–3400 Hz. Therefore, a filter is required to remove a high-frequency component from a signal. However, the known portable analog communication systems are designed for use in speech communication, and therefore the phase change caused by the filter is not taken into account in the design. In recent years, however, data communication using a modem has become popular, and a portable analog telephone device is now often used in data communication. However, the data rate via the portable analog telephone system is as low as 2400 bps. The low data rate mainly results from the following three factors. They are fading, hand-over, and group delay. The fading refers to a voltage (electric filed) variation in a received signal which occurs owing to interference between multiple radio waves propagating via multiple transmission paths. The fading is a problem inherent in the mobile communication. A sudden reduction in the electric field due to the fading causes a reduction in the signal-to-noise ratio, which in turn results in an increase in BER (bit error rate). In the case where the data is character data, the error will produce an incorrect character in the received data. The hand-over refers to the operation of automatically switching a telephone call when a portable telephone moves from a service area of a base station to an adjacent service area. The data lost during a switching time period is transmitted again.

The improvement of the problem associated with the group delay will be discussed below. First, a group delay caused by a filter will be discussed. In the case of a first-order LPF (low pass filter) shown in FIG. 10, the current I passing through the filter can be written as:

$$I=(Vin-Vout)/R=Vout/(1/j\omega C)$$

where Vin denotes the input voltage (in V), Vout the output voltage (in V), R the resistance, C the capacitance, and $\omega$ the angular frequency (in rad/s). From the above equation, the transfer function $T(j\omega)$ can be obtained as follows:

$$T(j\omega)=Vout/Vin=1/(1+j\omega CR) \quad (1)$$

If cutoff frequency $\omega o=1/CR$ is introduced into the above equation, then the characteristics associated with amplitude $|T(j\omega)|$, phase $\angle T(j\omega)$, and group delay $\tau(j\omega)$ are given as follows:

$$|T(j\omega)|=1/\sqrt{1+(\omega/\omega o)^2} \quad (2)$$

$$\angle T(j\omega)=-arctan((\omega/\omega o)) \quad (3)$$

$$\tau(j\omega)=-d[\angle T(j\omega)]/d\omega \quad (4)$$

The cutoff frequency o refers to a frequency at which a 3-dB reduction occurs in the amplitude $|T(j\omega)|$. Filters cause a change not only in the amplitude characteristic $|T(j\omega)|$ but also in phase characteristic $\angle T(j\omega)$. In the case of the above specific example, as can be seen from equation (3), a delay of 90 occurs for $\omega>>\omega o$. A great phase delay occurs near the cutoff frequency $\omega o$. The group delay $\tau(j\omega)$ is obtained by differentiating the phase $\angle T(j\omega)$ with respect to the angular frequency $\omega$, and thus the group delay $\tau(j\omega)$ indicates the degree of change in phase. Therefore, the group delay becomes large near the cutoff frequency $\omega o$. The group delay becomes approximately 500 $\mu$sec at $\omega o$ with respect to the delay for DC (0 Hz). A greater attenuation can be obtained by increasing the number of stages constituting a filter. However, the variation in phase and the group delay also increase with the number of stages. The transfer function is usually represented using a complex variable s. Thus, equation (1) becomes:

$$t(s)=1/(s+1) \quad (5)$$

This is the general expression of the first-order LPF.

FIG. 11 is a block diagram of the receiver section of a known portable analog telephone device having the capability of data/facsimile communication. In this figure, 1a denotes an RF demodulator which demodulates a received signal in a baseband signal; 2 denotes an audio frequency band-pass filter which extracts a signal component in an audio frequency band 300–3400 Hz from a baseband signal and selectively outputs the resultant signal; 3a denotes a voice signal processing circuit called a de-emphasis/expander that performs a predefined receiving operation; and 4a is a selection switch for selecting a device the output signal of the voice signal processing circuit 3a is provided to. In speech communication, the output of the voice signal processing circuit 3a is connected to a loudspeaker circuit 5 via the switch 4a. In data/facsimile communication, the switch 4a provides the output signal of the voice signal processing circuit 3a to a modem 7 and further to a personal computer 9 via a transceiver 8 with an RC-232 and V.28 communication interface. The processing described above is controlled by a central processing unit 6. A portable analog telephone device includes an interface terminal for interfacing an external device such as a headphone or an optional device usually called a hands-free adapter. A user can also use the interface terminal when performing data/facsimile communication.

Now, the operation will be described with reference to the figures. A portable analog telephone device such as that shown in FIG. 11 has been originally designed for use in speech communication. Therefore, the audio frequency band-pass filter 2 is designed without taking into consideration the group delay distortion within the passband. Instead, much consideration about the amplitude attenuation characteristic outside the passband is taken in the design so as to minimize the influence on adjacent channels. As a result, group delay distortion of 3 to 5 ms usually occurs within the audio frequency band. Among the overall group delay which occurs in the audio frequency circuits, the majority of the group delay occurs in the audio frequency band-pass filter 2. On the other hand, in data/facsimile communication, the group delay distortion which occurs on a transmission channel has a great influence on the characteristics of a data signal. If the group delay distortion becomes large to a level which can no longer be neglected with respect to the data bit rate, interference between data bits occurs, which causes distortion in the signal. As a result, incorrect reception due to a data error occurs.

FIG. 12 is a block diagram of a transmitter section employed in a known portable analog telephone device having the capability of data/facsimile communication. As shown in FIG. 12, a voice signal, which is given in the form of an electric signal via a microphone 11, is directed via a switch 4b to an audio frequency band-pass filter 10, which in turn extracts a signal having frequency components in the range from 300 to 3400 Hz and outputs the resultant signal to a voice signal processing circuit 3b including a preemphasis circuit, a compressor and a limiter. The voice signal processing circuit 3b also includes a filter for removing harmonic components and thus extracting a low-frequency component from the input signal. This filter is designed to have a large cutoff frequency and to be of rather low order so that the group delay in the audio frequency range (300 Hz to 3.4 kHz) becomes low enough. The output signal of the filter is then modulated by an RF modulator 1b and is output as an RF signal. When data/facsimile communication is performed, the data output from a personal computer 9 is input to a modem 7 via a transceiver 8 with an RC-232/V.28 communication interface. The output signal of the modem is directed via the switch 4b to the audio frequency band-pass filter 10. After that, the signal is passed through the same path as the voice signal and is finally output as an RF signal. The switch 4b, the audio frequency band-pass filter 10, the voice signal processing circuit 3b, and the RF modulator 1b are all controlled by the central processing unit 6. In the transmitter section, as in the receiver section, the audio frequency band-pass filter 10 is designed with a great consideration on the amplitude attenuation characteristic outside the passband. As a result, group delay distortion of 3 to 5 ms usually occurs within the audio frequency band range from 300 to 3400 Hz.

In the known portable analog telephone device, as described above, when data/facsimile communication is performed, data is passed through the same signal path as the existing path designed to process a voice signal. As a result, the data signal encounters group delay distortion which can cause an error in the data.

SUMMARY OF THE INVENTION

It is a general object of the present invention to solve the problems described above. More specifically, it is an object of the present invention to provide a portable analog communication device having an additional signal path with a small group delay for processing data signal in data/facsimile communication without producing degradation in the data signal.

According to an aspect of the present invention, there is provided a portable analog communication device including: an RF demodulator for demodulating a received RF signal into a baseband signal; a first filter for filtering the above-described baseband signal; a second filter for filtering said baseband signal with a group delay less than the first filter; filter connection means for selecting the first filter when the RF signal is a voice signal and selecting the second filter when the RF signal is a data signal thereby outputting the signal filtered by the selected filter; a signal processing circuit for performing predetermined processing on the output signal of the filter selection means; and device selection means for selecting a device the output signal of the signal processing circuit is provided to depending on whether said RF signal is a voice signal or a data signal.

According to another aspect of the invention, there is provided a portable analog communication device including: a first filter for filtering an input voice signal; a second filter for filtering an input data signal with a group delay less than the first filter; filter selection means for selecting either the first filter or the second filter depending on whether the input signal is a voice signal or a data signal thereby outputting the signal filtered by the selected filter; a signal processing circuit for performing predetermined processing on the filtered signal; and an RF transmission circuit for modulating the output signal of the signal processing circuit and transmitting a resultant RF signal.

According to another aspect of the invention, there is provided a portable analog communication device including: a first filter for filtering an input voice signal; an input terminal for inputting a data signal; filter connection means for selectively connecting the input terminal to the first filter depending on whether the input signal is a voice signal or a data signal thereby outputting the signal filtered by the first filter; a signal processing circuit for performing predetermined processing on the filtered signal; and an RF transmission circuit for modulating the output signal of the signal processing circuit and transmitting a resultant RF signal.

In the portable analog communication device according to the present invention, the second filter is preferably a cosine roll-off filter.

In the portable analog communication device according to the present invention, the second filter may preferably be a Bessel filter.

A portable analog communication device according to the furthermore next invention the second filter may preferably be a Butterworth band-pass filter.

DESCRIPTION OF THE PREFERRED EMBODIMENTS

Embodiment 1

Figure 1:
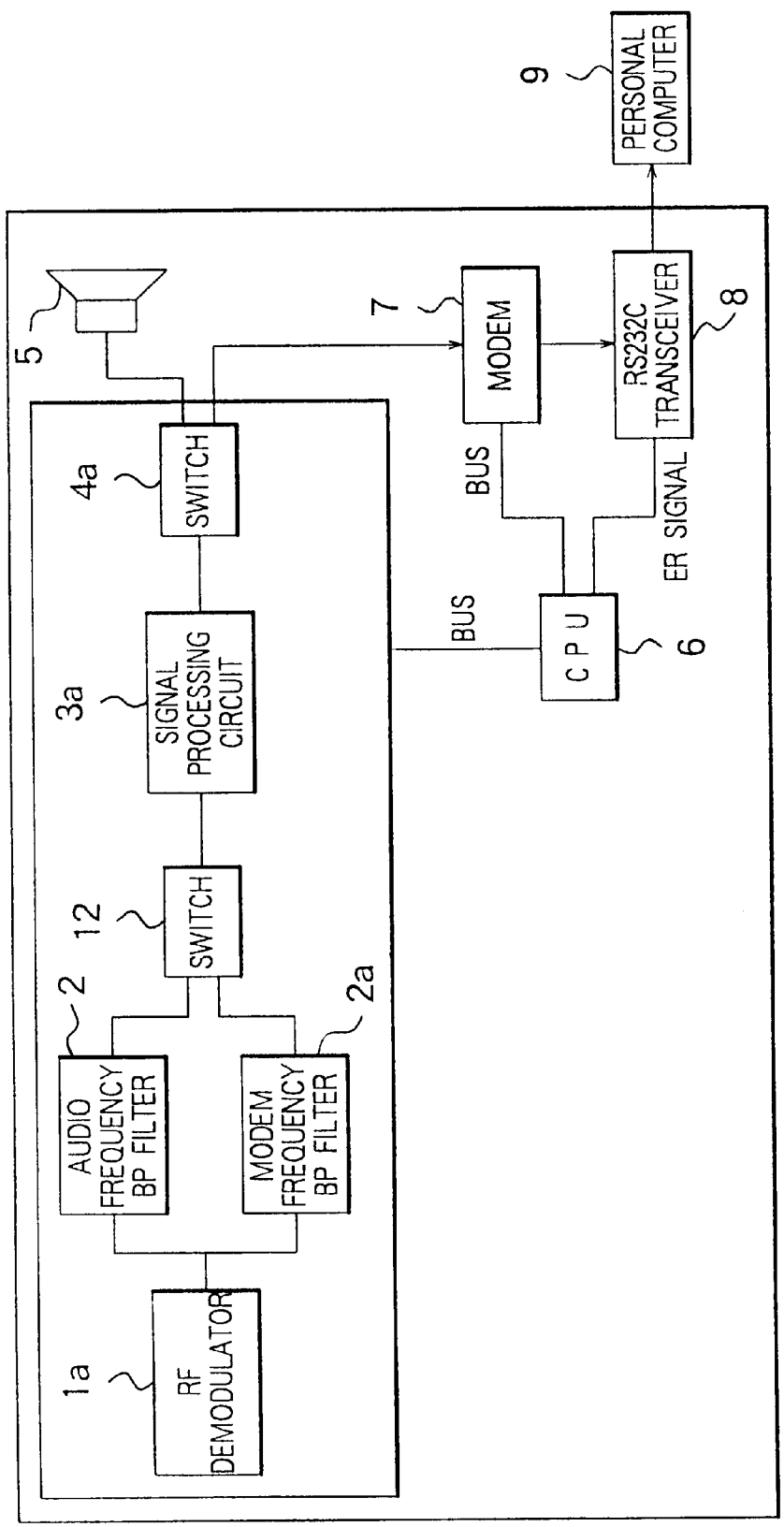
FIG. 1 is a block diagram illustrating a receiver section of a portable analog communication device according to a first embodiment of the present invention.

FIG. 1 is a block diagram illustrating a receiver section of a portable analog telephone device according to an embodiment of the present invention. In FIG. 1, reference numeral 1a denotes an demodulator for demodulating a received RF signal into either a baseband voice signal or a baseband data signal; 2 denotes an audio frequency band-pass filter for filtering a voice signal of the baseband signals; 2a denotes a modem frequency band-pass filter for filtering a data signal of the baseband signals with a less group delay than the audio frequency band-pass filter 2; 12 denotes a switching circuit for selecting the output signal of either the audio frequency band-pass filter 2 or the modem frequency band-pass filter 2a depending on the type of the baseband signal; 3a denotes a voice signal processing circuit for performing a process such as expansion or deemphasis on the baseband signal; 4a denotes a switching circuit for selecting the device the baseband signal is output to depending on the type of a baseband signal; 5 denotes a loudspeaker circuit for outputting a voice signal; 7 denotes a modem for demodulating a data signal; 8 denotes a transceiver with an RC-232/V.28 communication interface; and 9 denotes a personal computer.

Now, the operation will be described with reference to the accompanying drawings. In FIG. 1, all components except the personal computer 9 are included in the portable analog telephone device. The personal computer 9 is connected to the transceiver 8 via a connector such as a D-SUB connector. The components except the modem 7, the transceiver 8, and the personal computer 9 are controlled by the central processing unit 6. In speech communication, the voice signal demodulated by the RF demodulator 1a is directed to the loudspeaker circuit 5 via the audio frequency band-pass filter 2 selected by the switch 12, the voice signal processing circuit 3a, and the switch 4a. In data/facsimile communication, on the other hand, the data signal demodulated by the RF demodulator 1 is directed to the modem 6 via the modem frequency band-pass filter 2a selected by switch 12, the voice signal processing circuit 3a, and the switch 4a. As for the modem frequency band-pass filter 2a, a cosine roll-off filter is theoretically ideal in that it has an odd-symmetry characteristic about the cutoff frequency ωo and no intersymbol interference occurs. However, other types of filters having a simpler circuit configuration which can provide as small a group delay distortion as required may also be employed. A specific example of such a filter is a low-order Bessel filter.

Figure 2:
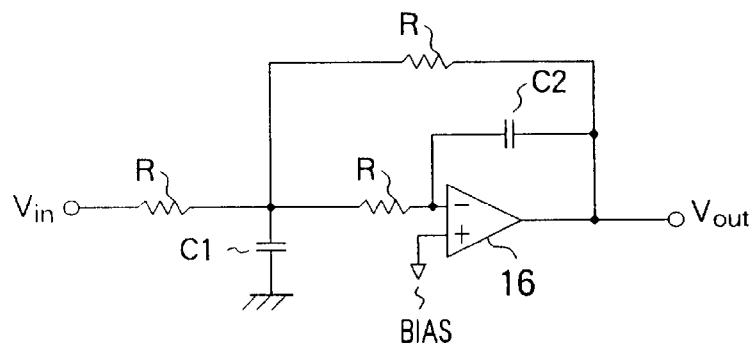
FIG. 2 is a circuit diagram illustrating a multiple feedback type low-pass filter.

FIG. 2 is a circuit diagram of a two-stage multiple feedback type low-pass filter. As shown in FIG. 2, the filter includes an operational amplifier 16, resistors R (Ω), and capacitors C1 and C2 (F). If the input and output voltages are denoted by Vin(V) and Vout(V), respectively, then $$Vin/Vout=-1/(C1*C2*R^2)/(s^2+3s/(C1*R)+1/(C1*C2*R^2)) \qquad (6)$$

Figure 3:
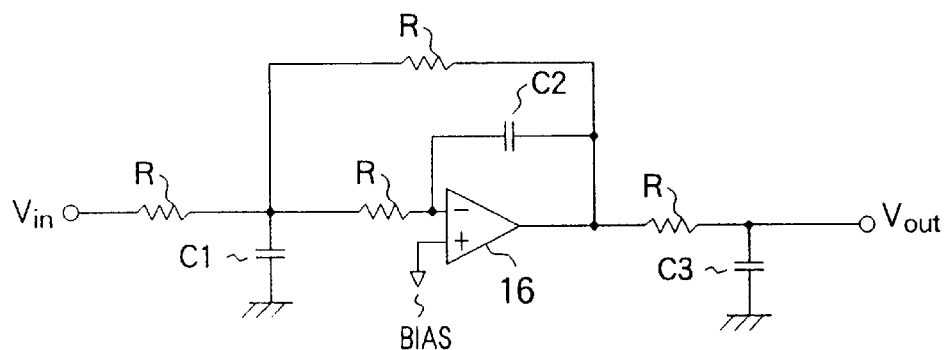
FIG. 3 is a circuit diagram illustrating a 3RD-stage Bessel low-pass filter.
Figure 10:
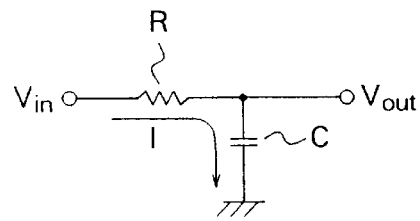
FIG. 10 is a circuit diagram illustrating a known 1ST-stage low-pass filter.
Figure 11:
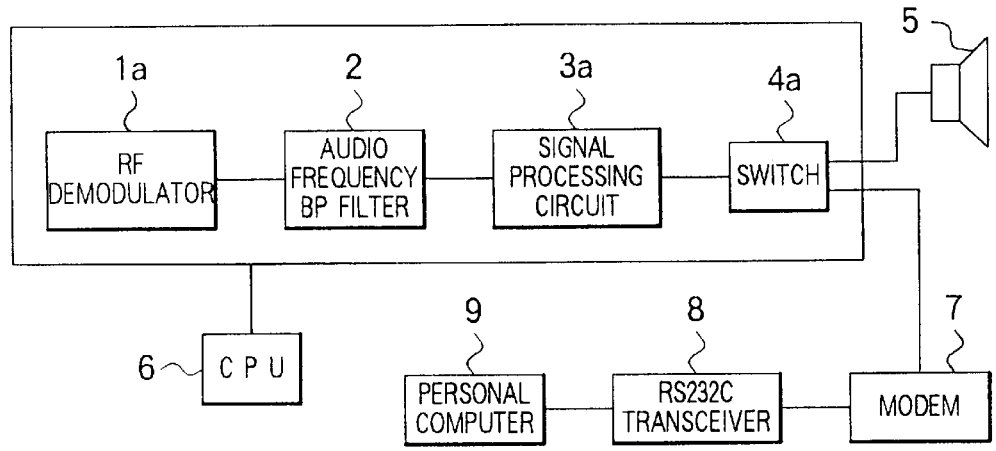
FIG. 11 is a block diagram illustrating a receiver section of a known portable analog communication device.
Figure 12:
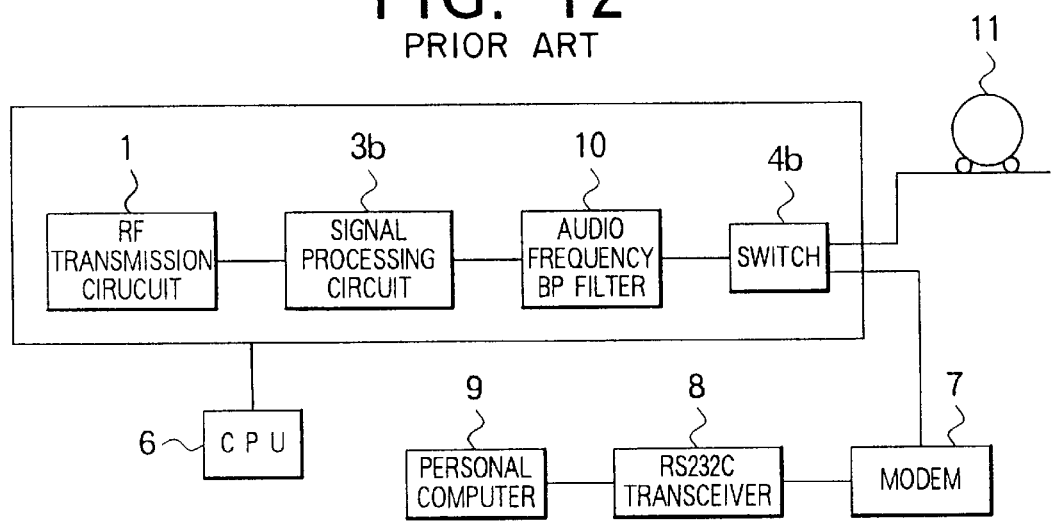
FIG. 12 is a block diagram illustrating a transmitter section of the known portable analog communication device.

Furthermore, if the respective parameters are selected in such a manner as to satisfy the second-order Bessel transfer function T(s) described below:

$$T(s)=3b^2/(s^2+3bs+3b^2) \qquad (7)$$

then the resultant filter becomes a Bessel filter. If the filter shown in FIG. 10 and that shown in FIG. 2 are cascaded as shown in FIG. 3, a 3-stage Bessel filter can be obtained. For example, a 3-stage Bessel filter with a cutoff frequency of 3.8 kHz can be obtained by selecting the parameters as R=10 kΩ, C1=5988 pF, C2=1396 pF, and C3=316 pF.

Figure 4:
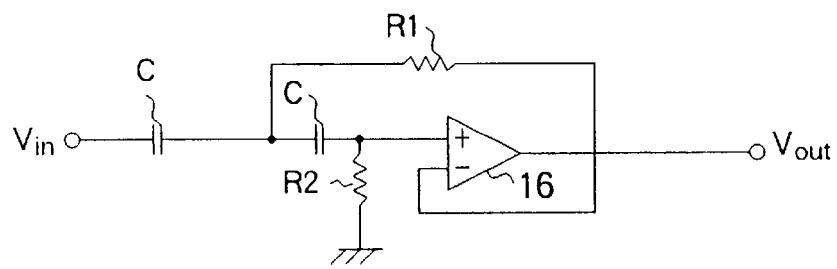
FIG. 4 is a circuit diagram illustrating a 2ND-stage VCVS type high-pass filter.
Figure 5:
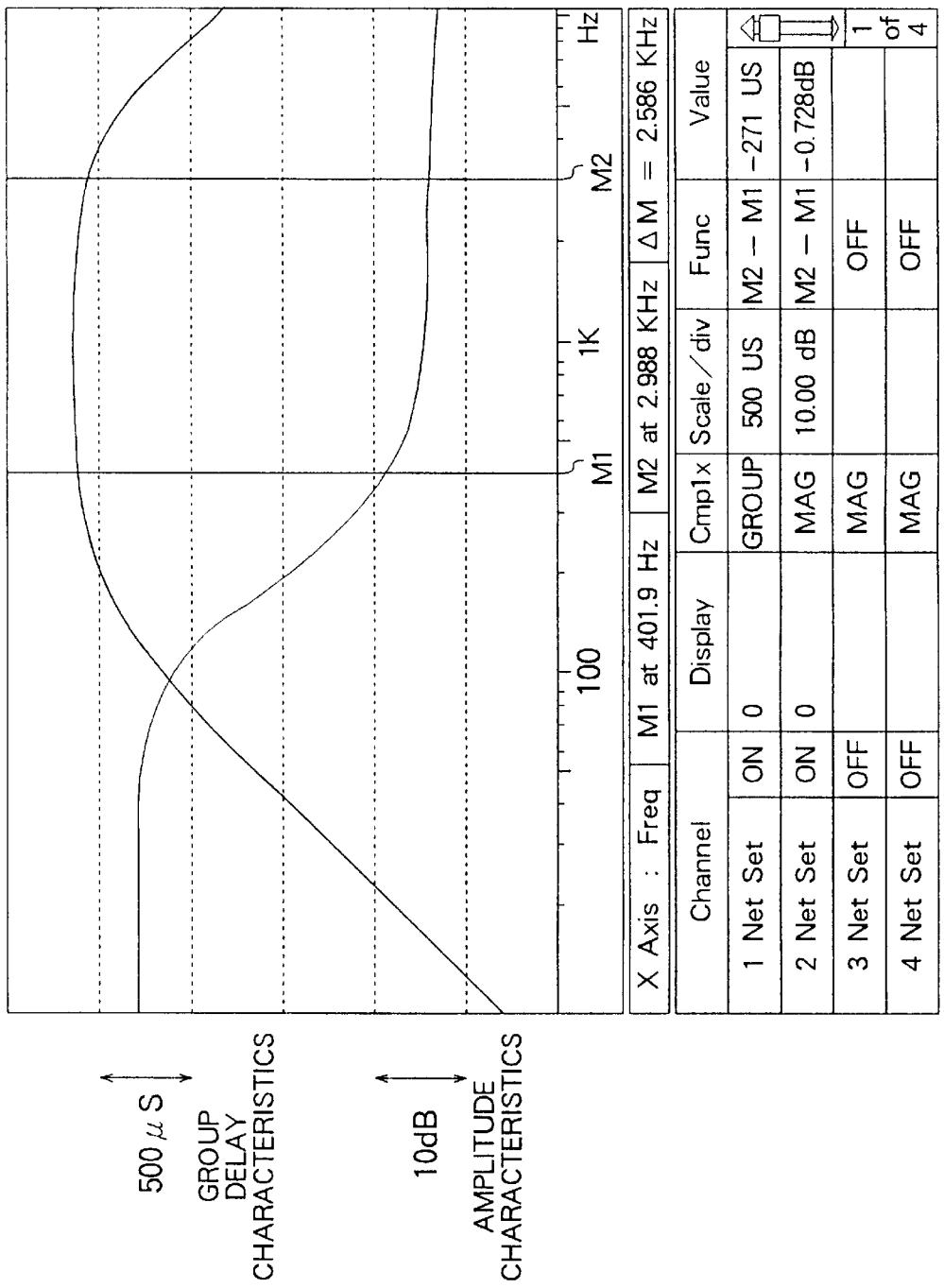
FIG. 5 is a schematic diagram illustrating the frequency characteristic of a modem-frequency Bessel band-pass filter according to an embodiment of the invention.

FIG. 4 is a circuit diagram illustrating a two-stage VCVS type high-pass filter. As shown in FIG. 4, the filter includes an operational amplifier 16, capacitors C (F), and resistors R1 and R2 (Ω). If the parameters are selected for example such that C=0.01 pF, P1=79.6 kΩ, and R2=106 kΩ then the resultant high-pass filter has a cutoff frequency of 300 Hz. If this filter is combined with the filter shown in FIG. 3, then the resultant filter becomes a Bessel band-pass filter having the characteristics shown in FIG. 5. In this filter shown in FIG. 5, the group delay in the frequency band 400 Hz to 3 kHz (between M1 and M2 in FIG. 5) is about 270 μsec, which is sufficiently low to suppress the degradation of signal in data/facsimile communication.

The switching operation of the switch 12 is performed in response to the command issued by the control of the central processing unit 6 of the portable telephone device as follows. If a communication software program on the personal computer 9 connected to the transceiver 8 is started, the transceiver 8 sends a data terminal ready (ER) signal to the central processing unit 6. At this point, in response to the command issued by central processing unit 6 it is assumed that a user is going to make not a speech call but a data/facsimile transmission, and thus the switching circuits 4a and 12 select the modem 7 and the modem frequency band-pass filter 2a.

Embodiment 2

Figure 6:
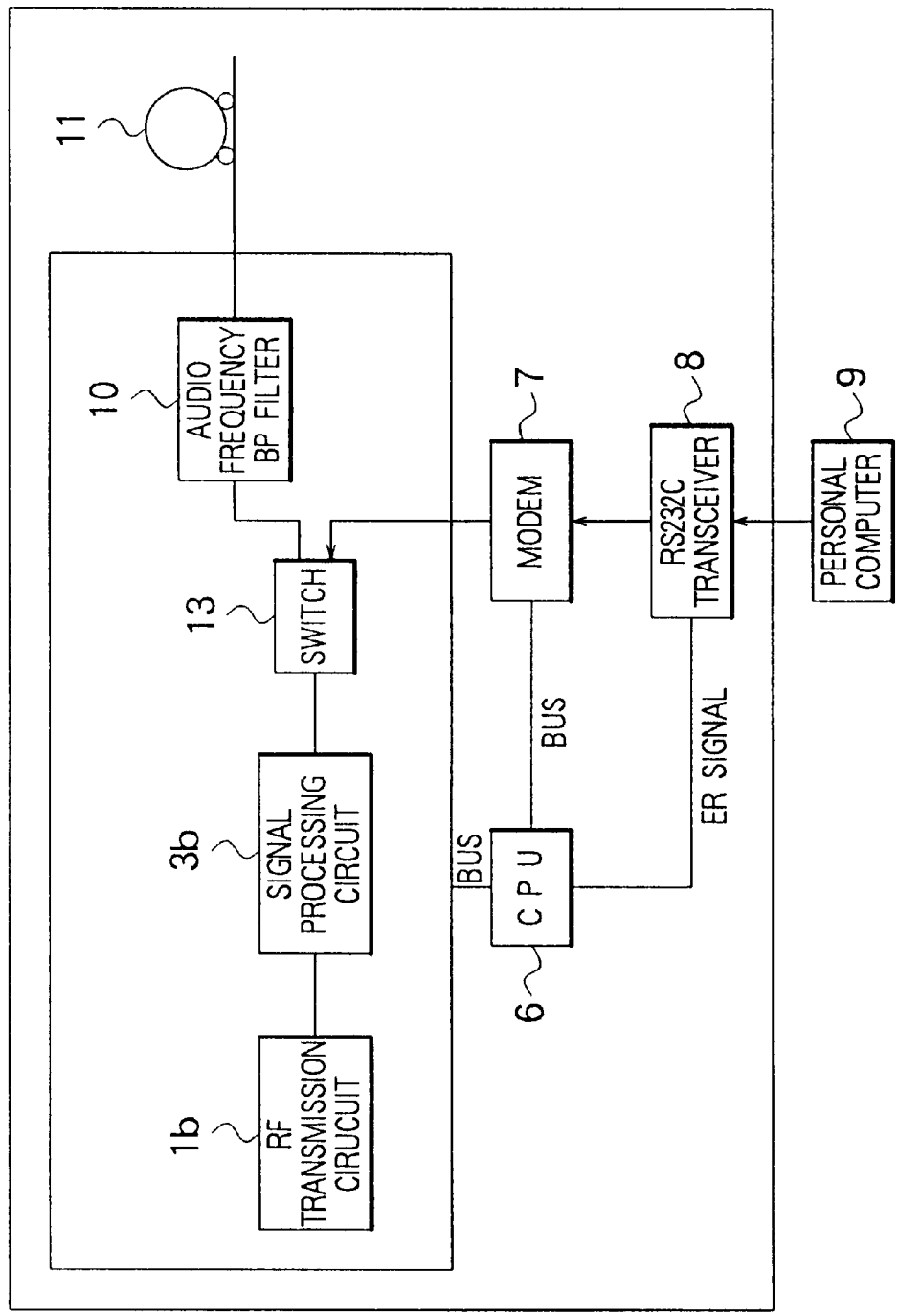
FIG. 6 is a block diagram illustrating a transmitter section of a portable analog communication device according to a second embodiment of the present invention.

FIG. 6 is a block diagram illustrating a transmitter section of a portable analog telephone device according to another embodiment of the present invention. In FIG. 6, a voice signal, which is given in the form of an electric signal via a microphone 11, is applied to an audio frequency band-pass filter 10. The output signal of the audio frequency band-pass filter 10 is applied to a voice signal processing circuit 3b via a switch 13. The voice signal is then modulated by an RF transmission circuit 1b, and finally output as an RF signal. When data/facsimile communication is performed, the data signal output from a personal computer 9 is input to a modem 7 via a transceiver 8. The output signal of the modem is directed via the switch 13 to the voice signal processing circuit 3b. After that, the signal is passed through the same path as the voice signal and is finally output as an RF signal. In the operation, the components except the modem 7, the transceiver 8, and the personal computer 9 are controlled by the central processing unit 6.

Now, it is assumed here that a modem signal is according to V.32 in series of CCITT-recommended standards. In this case, the modem 7 may preferably be a 9600-bps two-wire full-duplex modem which operates according to the modulation scheme called 32QAM. The carrier frequency may preferably be 1800 Hz. The modulated signal can be regarded as having a frequency spectrum with a bandwidth of ±1200 Hz centered at the above carrier frequency. The transmission power decreases by 4.5±2.5 dB at 600 Hz and also at 3000 Hz with respect to the maximum power in the frequency range. This means that in the data/facsimile communication, unlike the speech communication, no particular circuit for limiting the bandwidth is required. That is, the band-pass filter 10 is no longer necessary in the data/facsimile communication. The operation of the switch 13 is controlled by the central processing unit 6 as follows. If a communication software program on the personal computer 9 connected to the transceiver 8 is started, the transceiver 8 sends a data terminal ready (ER) signal to the central processing unit 6. At this point, it is assumed that a user is going to make not a speech call but a data/facsimile transmission, and thus the switching circuit 13 selects the bus connected to the modem 7.

In this arrangement as described above, in the case of data/facsimile communication, the signal processing is performed on the data signal without passing the data signal through the audio frequency band-pass filter and the resultant signal is transmitted from the RF transmission circuit. This allows suppression of the degradation in the data signal due to the group delay distortion.

Embodiment 3

Figure 7:
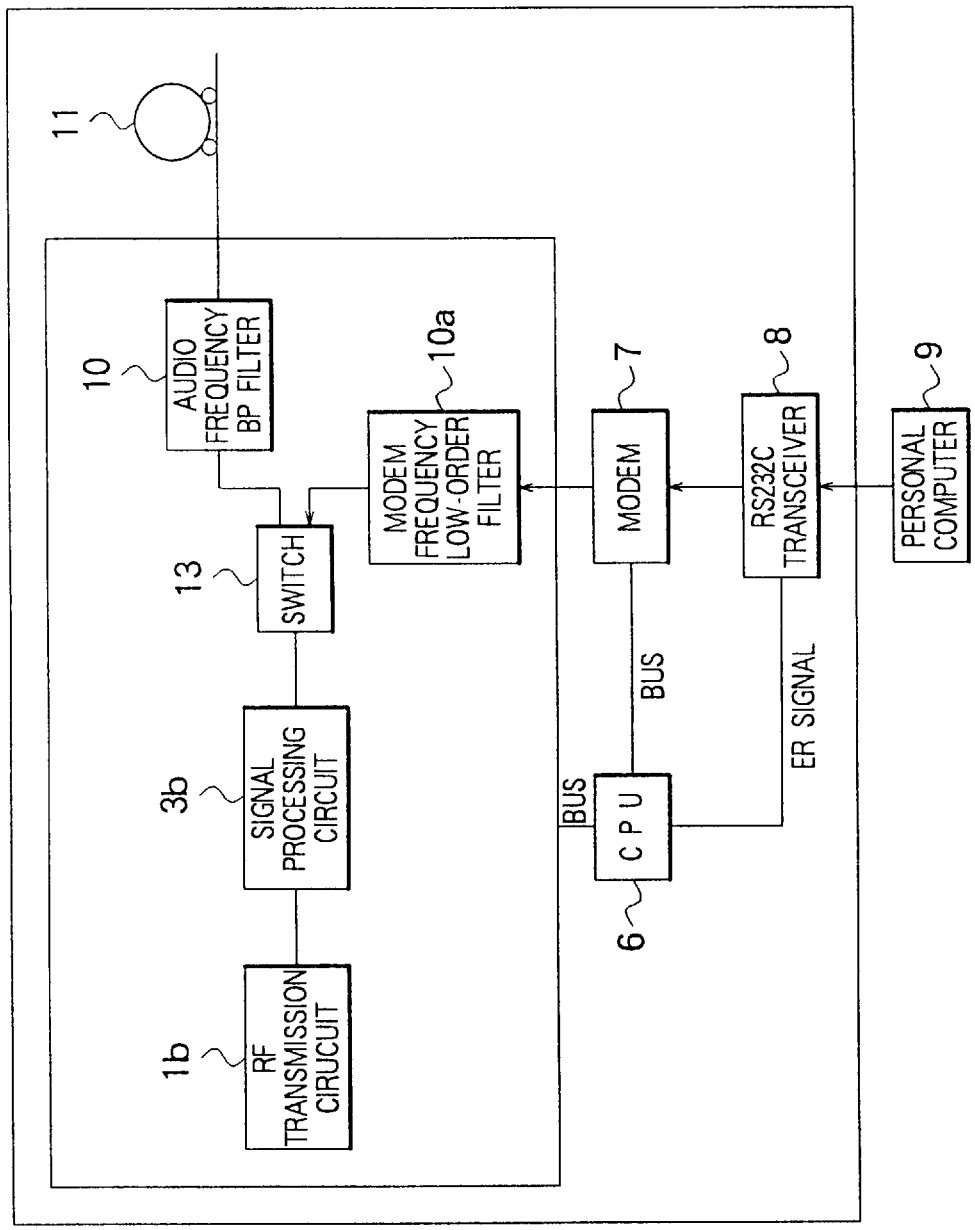
FIG. 7 is a block diagram illustrating a transmitter section of a portable analog communication device according to a third embodiment of the present invention.
Figure 8:
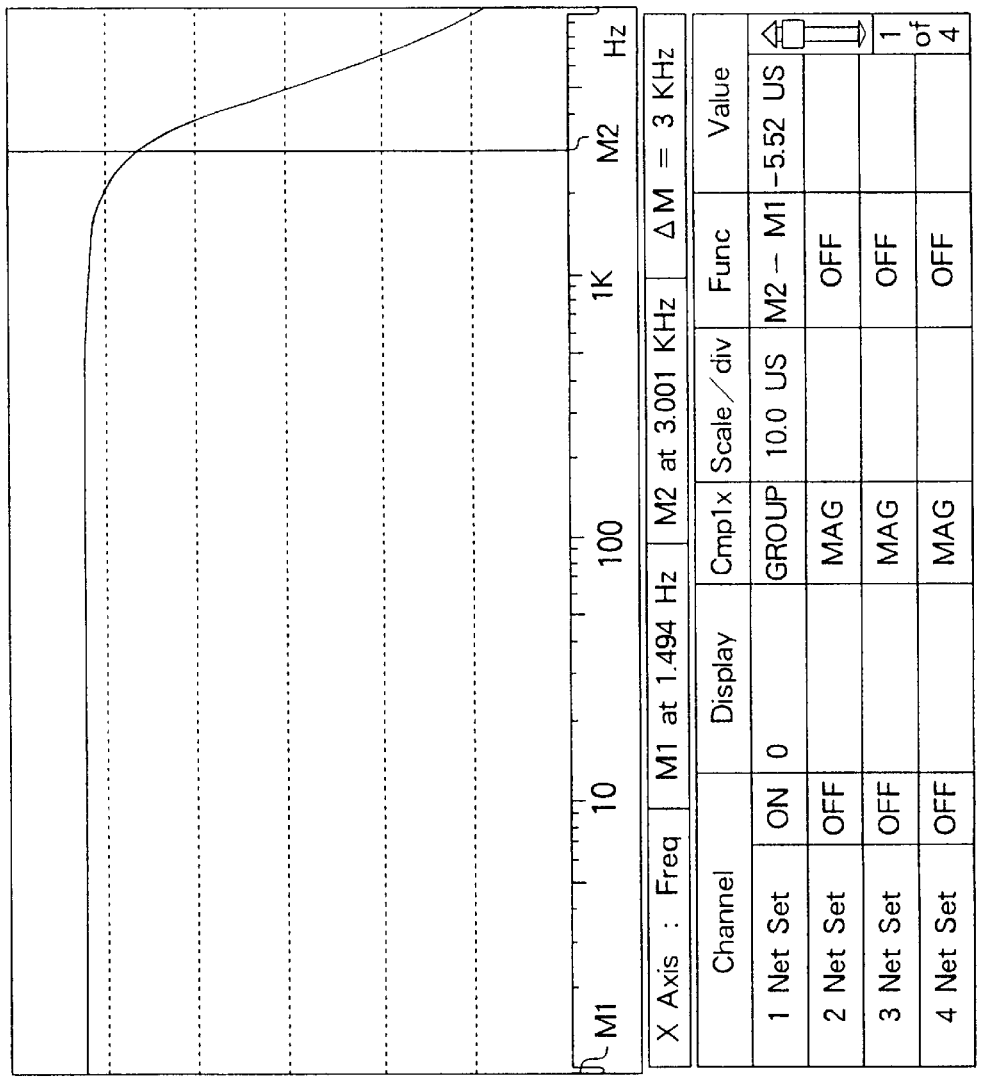
FIG. 8 is a schematic diagram illustrating the frequency characteristic of a modem-frequency-band Bessel low-pass filter according to an embodiment of the invention.

In the embodiment shown in FIG. 6, the data signal does not pass through any filter during data/facsimile communication. However, the data signal may also be passed through a filter with a small group delay. FIG. 7 is a block diagram illustrating such an embodiment of a transmitter section of a portable analog telephone device. In FIG. 7, reference numeral 10a denotes a modem frequency band low-order filter for filtering a data signal. The filter 10a may be implemented for example with a second-order Bessel low-pass filter. FIG. 8 shows the group delay characteristic of a two-stage Bessel low-pass filter with a cutoff frequency of 3.8 kHz. As shown in FIG. 8, the group delay in the range M1 to M2 namely 400 Hz to 3 kHz is as small as 5.5 μsec. In data/facsimile communication, the data signal is passed through the modem-frequency low-order filter 10a having extremely small group delay distortion. In other words, the transmitter section has a small group delay, and therefore the degradation in the data signal is suppressed. The switching operation of the switch 13 is performed in a similar manner to that described above with reference to FIG. 6.

Figure 9:
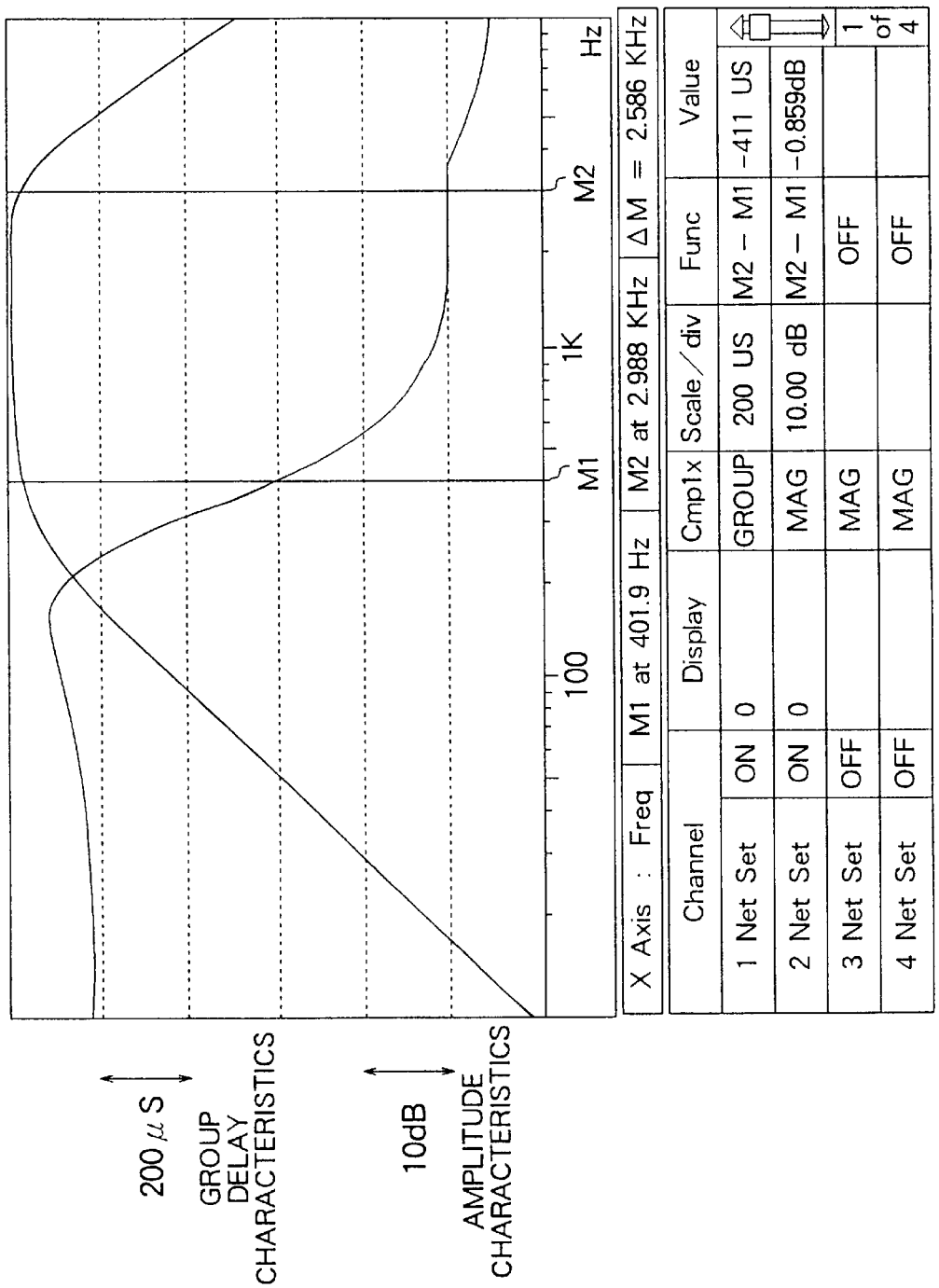
FIG. 9 is a schematic diagram illustrating the frequency characteristic of a modem-frequency Butterworth band-pass filter according to an embodiment of the invention.

In the first embodiment described above, although a Bessel filter is employed to achieve a good group delay characteristic in the modem-frequency band-pass filter 2a, other types of filters such as a Butterworth filter may also be employed. FIG. 9 shows the frequency characteristic of a Butterworth band-pass filter employed as the modem-frequency band-pass filter 2a. In this case, as shown in FIG. 9, the group delay in the range M1 to M2 namely 400 Hz to 3 kHz is about 410 μsec.

In the first embodiment, the switch 12 is disposed at the output side of the band-pass filters 2 and 2a. However, the switch 12 may be disposed at the input side.

As for the modem-frequency band-pass filter 2a and the modem frequency low-order filter 10a, a multiple feedback type filter such as that shown in FIG. 2 or a VCVS type filter such as that shown in FIG. 4 may also be employed.

In the specific embodiment shown in FIG. 1, two filters, that is, the filter 2 and the modem-frequency band-pass filter 2a are used. However, a single high-order filter may also be employed. For example, if a biquardratic filter or an SCF (switched capacitor filter) of the 5th order is used, an intermediate node may be used to provide an additional second filter having a low group delay.

In the present invention, as described above, the filter connection means in the receiver section of the portable analog communication device selects a filter in such a manner that when the received RF signal is a voice signal the first filter is selected while the second filter having a smaller group delay than the first filter is selected when the received RF signal is a data signal. Furthermore, the device selection means selects a device the output signal of the signal processing circuit is provided to depending on whether the RF signal is a voice signal or a data signal. This allows suppression of the degradation or the group delay distortion in the received data signal.

Furthermore, in the transmitter section of the portable analog communication device according to the present invention, the filter connection means selects either the first filter or the second filter having a smaller group delay than the first filter depending on whether the input signal is a voice signal or a data signal. The filtered signal is processed by the signal processing circuit and then modulated by the RF transmission circuit. The resultant signal is finally transmitted from the RF transmission circuit. Thus, the invention provides a portable analog communication device having the advantage that the group delay distortion in the data signal to be transmitted is suppressed and thus a high-quality data signal can be transmitted without degradation.

Furthermore, in the transmitter section of the portable analog communication device according to another aspect of the present invention, the filter connection means connects the data signal input terminal to the first filter depending on whether the input signal is a voice signal or a data signal so that the signal is filtered by the first filter only when the input signal is a voice signal. The RF transmission circuit modulates the output signal of the signal processing circuit and then transmits the resultant signal as an RF signal. As a result, in this portable analog communication device, when the signal to be transmitted is a data signal, the data signal is not passed through the filter and thus no group delay distortion occurs.

In the portable analog communication device according to another aspect of the present invention, a cosine roll-off filter having odd-symmetry about the cutoff frequency is employed as the second filter thereby achieving low intersymbol interference distortion in addition to the suppressed group delay distortion.

In the portable analog communication device according to still another aspect of the present invention, a Bessel filter is employed as the second filter thereby achieving low group delay distortion with a simple circuit configuration. Thus, the portable analog communication device of the invention can deal with a data signal without introducing degradation.

In the portable analog communication device according to still another aspect of the present invention, a Butterworth band-pass filter is employed as the second filter thereby achieving low group delay distortion with a simple circuit configuration. Thus, the portable analog communication device of the invention can deal with a data signal without introducing degradation.

What is claimed is:

1. A portable analog communication device comprising:
   an RF demodulator for demodulating a received RF signal into a baseband signal;
   a first filter for filtering said baseband signal;
   a second filter for filtering said baseband signal with a group delay less than said first filter;
   filter connection means for selecting the first filter when said RF signal is a voice signal and selecting the second filter when said RF signal is a data signal thereby outputting the signal filtered by the selected filter;
   a signal processing circuit for performing predetermined processing on the output signal of said filter connection means; and
   device selection means for selecting a device to which the output signal of said signal processing circuit is provided depending on whether said RF signal is a voice signal or a data signal.

2. The portable analog communication device according to claim 1, wherein said second filter is a cosine roll-off filter.

3. The portable analog communication device according to claim 1, wherein said second filter is a Bessel filter.

4. The portable analog communication device according to claim 1, wherein said second filter is a Butterworth band-pass filter.

5. A portable analog communication device comprising:

a first filter for filtering an input voice signal;

a second filter for filtering an input data signal with a group delay less than said first filter;

filter connection means for selecting either said first filter or second filter depending on whether the input signal is a voice signal or a data signal thereby outputting the signal filtered by the selected filter;

a signal processing circuit for performing predetermined processing on said filtered signal; and an RF transmission circuit for modulating the output signal of said signal processing circuit and transmitting a resultant RF signal.

6. The portable analog communication device according to claim 5, wherein said second filter is a cosine roll-off filter.

7. The portable analog communication device according to claim 5, wherein said second filter is a Bessel filter.

8. The portable analog communication device according to claim 5, wherein said second filter is a Butterworth band-pass filter.

9. A portable analog communication device comprising:

a first filter for filtering an input voice signal;

an input terminal for inputting a data signal;

filter connection means for selectively connecting said input terminal to said first filter depending on whether the input signal is a voice signal or a data signal thereby outputting the signal filtered by the first filter;

a signal processing circuit for performing predetermined processing on said filtered signal; and an RF transmission circuit for modulating the output signal of said signal processing circuit and transmitting a resultant RF signal.

* * * * *

UNITED STATES PATENT AND TRADEMARK OFFICE
CERTIFICATE OF CORRECTION

PATENT NO. : 5,978,658
DATED : November 2, 1999
INVENTOR(S) : Shinichiro SHOJI

It is certified that error appears in the above-identified patent and that said Letters Patent is hereby corrected as shown below:

COLUMN 1, LINE 35, "filed" should read --field--.

Signed and Sealed this

Twenty-eighth Day of November, 2000

Attest:

Q. TODD DICKINSON

Attesting Officer

Director of Patents and Trademarks